(12) United States Patent
Iverson (10) Patent No.: US 7,766,356 B2
(45) Date of Patent: Aug. 3, 2010

(54) VEHICLE MUD FLAP WITH FASTENING TAB

(75) Inventor: David S. Iverson, Chicago, IL (US)

(73) Assignee: MacNeil IP LLC, Downers Grove, IL (US)

( * ) Notice: Subject to any disclaimer, the term of this patent is extended or adjusted under 35 U.S.C. 154(b) by 405 days.

(21) Appl. No.: 11/856,441

(22) Filed: Sep. 17, 2007

(65) Prior Publication Data

US 2008/0001390 A1 Jan. 3, 2008

(51) Int. Cl.
*B62D 25/18* (2006.01)
(52) U.S. Cl. ........................ 280/154; 280/851
(58) Field of Classification Search ................ 280/847, 280/152.05, 152.1, 152.3, 154, 848, 851, 280/852; 172/508, 509, 517; 292/DIG. 1
See application file for complete search history.

(56) References Cited

U.S. PATENT DOCUMENTS

| | | | |
|---|---|---|---|
| 1,513,167 A | 10/1924 | Fleming | |
| 1,809,711 A | 6/1931 | Kile | |
| 2,826,428 A | 3/1958 | Lincoln | |
| 3,953,053 A | 4/1976 | Arenhold | |
| 4,323,262 A * | 4/1982 | Arenhold | 280/851 |
| 4,605,238 A | 8/1986 | Arenhold | |
| 4,688,814 A | 8/1987 | Arenhold | |
| 4,733,879 A | 3/1988 | Arenhold | |
| 5,048,868 A | 9/1991 | Arenhold | |
| 5,120,082 A * | 6/1992 | Ito | 280/851 |
| 6,431,605 B1 | 8/2002 | Miller et al. | |
| 6,648,373 B2 | 11/2003 | Hawes | |
| 6,919,501 B2 | 7/2005 | Burton | |
| 6,971,828 B2 | 12/2005 | Bernardo | |
| 6,974,175 B2 | 12/2005 | Willey | |
| 7,537,243 B1 * | 5/2009 | Perry | 280/847 |
| 7,578,527 B2 * | 8/2009 | Iverson et al. | 280/851 |
| 2006/0084407 A1 | 12/2006 | Iverson et al. | |
| 2006/0284407 A1 * | 12/2006 | Iverson et al. | 280/847 |
| 2007/0096454 A1 * | 5/2007 | Iverson | 280/851 |

FOREIGN PATENT DOCUMENTS

| | | |
|---|---|---|
| DE | 3532985 A1 | 3/1987 |
| DE | 4415648 C1 | 7/1995 |

(Continued)

OTHER PUBLICATIONS

British Patent Office, Combined Search and Examination Report of GB Application No. GB0718453.4, dated Jan. 23, 2008.

(Continued)

*Primary Examiner*—Glenn Dayoan
*Assistant Examiner*—John R Olszewski
(74) *Attorney, Agent, or Firm*—Momkus McCluskey, LLC; Jefferson Perkins (57) ABSTRACT

The drilling of new holes into a vehicle fender fold is avoided by providing a mud flap with at least one rotating clamping member that clamps to the wheel well fender fold and, spaced from this clamping member, a tab which captures the end of a wheel well fender fold between itself and a general rear surface of the mud flap body. It is preferred that the tab be integrally molded with the mud flap body.

11 Claims, 10 Drawing Sheets

FOREIGN PATENT DOCUMENTS

| | | | |
|---|---|---|---|
| FR | 2410591 | A | 8/1979 |
| GB | 928004 | A | 6/1963 |
| GB | 2045706 | A1 | 11/1980 |
| GB | 2114946 | A1 | 9/1983 |
| GB | 2223723 | A1 | 4/1990 |
| GB | 2327401 | A1 | 1/1999 |
| JP | 4244488 | A1 | 9/1992 |

OTHER PUBLICATIONS

Search Report, The Patent Office, Application No. GB 9711746.9, Nov. 16, 1998.

* cited by examiner

VEHICLE MUD FLAP WITH FASTENING TAB

BACKGROUND OF THE INVENTION

Conventional motor vehicles have tires partly recessed in wheel wells. Of course the tire extends below, and often far below, the bottom body panel of the vehicle. As it rotates on a surface each wheel (particularly if it is a drive wheel) will have a tendency to kick up tar, water, mud, stones and debris onto the vehicle body panel or rearwardly into the path of traffic behind the vehicle.

To mitigate this problem, mud flaps have been devised which attach to the rear of each wheel well and which extend downward toward the road surface, intercepting much of the matter spinning off of the wheel. Many of these mud flaps have been designed for the automotive aftermarket, in which a vehicle owner will attach the mud flap to the wheel well himself or herself. Prior automotive mud flaps have required further holes to be drilled into the flange called a "fender fold" or lip, which is an extension of the vehicle body panel that skirts the wheel well and which commonly is fabricated of sheet steel. While the use of through-fasteners through such holes usually will assure firm affixation of the mud flap to the vehicle, drilling the holes creates a serious corrosion problem and may void the OEM corrosion warranty.

Many prior attempts to affix mud flaps to vehicles without drilling such holes have been less than satisfactory. A need therefore persists for methods and fasteners for firmly affixing mud flaps to vehicle wheel wells without creating a corrosion problem.

SUMMARY OF THE INVENTION

According to one aspect of the invention, there is provided a mud flap for attachment to a fender fold of a vehicle wheel well. The body of the mud flap has a front face that generally faces in the direction of vehicle travel and a general rear face which is adapted to be positioned forwardly adjacent the fender fold of the wheel well. A tab, which preferably is integrally molded with the mud flap body, has a forward surface which is substantially parallel to and rearwardly displaced from the general rear face of the mud flap body. The forward surface of the tab and the general rear face of the mud flap body define there between a channel for receiving the fender fold, capturing it and thereby providing a point of affixation of the mud flap to the vehicle. At least one sidewall attaches the tab to the mud flap body.

In a preferred embodiment, two such sidewalls join the tab to the mud flap body. A first of these sidewalls is positioned, when in use, inboard of an end of the fender fold. A second of these sidewalls is positioned, when in use, upward of an upper margin of the fender fold. The first and second sidewalls, in combination with the tab and the general rear face of the mud flap body, create a four-sided pocket into which the end of the fender fold can be slid.

In one embodiment of the invention, the mud flap also includes at least one fastener, spaced from the tab, to affix the mud flap body to the fender fold at another affixation point along the fender fold. While fasteners of various sorts can be used, such as one employing sliding clamps, a preferred fastener includes a central bolt or screw, on which is threadedly carried a rotating clamping member. A clamping arm of the rotating clamping member extends radially outwardly from an axis of the bolt or screw. The bolt or screw is inserted through a through-hole in the mud flap body.

To affix the mud flap to the vehicle, a general rear surface of the mud flap body is positioned adjacent the wheel well fender fold. The body is slid in an upper and outboard direction so that the end of the fender fold is captured between the tab and the general rear surface. After the capture of the fender fold end, one or more fasteners may be used to fasten one or more other points of the mud flap body to the fender fold. These other fasteners can be bolts or screws which fit into holes predrilled by the automobile manufacturer, or, in the instance that no such holes exist, can be clamps which clamp onto the fender fold. It is particularly preferred to use, as one or more of these fasteners, one which employs a rotating clamping member, as described above. A screw of such a fastener, accessible from the front or wheel-facing face of the mud flap, is rotated to swing the clamping arm of the rotating clamping member from a disengaged position to a second position behind the vehicle fender fold. The rotating clamping member then hits a stop which prevents its rotation with the screw as a unit. Further rotation of the screw causes the rotating clamping arm to be drawn on the threads of the screw toward the stationary clamping member, securely clamping the mud flap body to the fender fold.

The present invention thus provides a secure method of affixing a mud flap to a vehicle wheel well fender fold without drilling further holes, and without requiring the end user to manipulate a fastener component on the relatively inaccessible, rearward side of the fender fold or back side of the mud flap body to be attached. The present invention has particularly advantageous application to those wheel wells which have no predrilled holes at all, such that a combination of the above-described tab and one or more clamping fasteners are used as the means to firmly affix the mud flap to the vehicle.

BRIEF DESCRIPTION OF THE DRAWINGS

Further aspects of the invention and their advantages can be discerned in the following detailed description, in which like characters denote like parts and in which.

DETAILED DESCRIPTION

Figure 1:
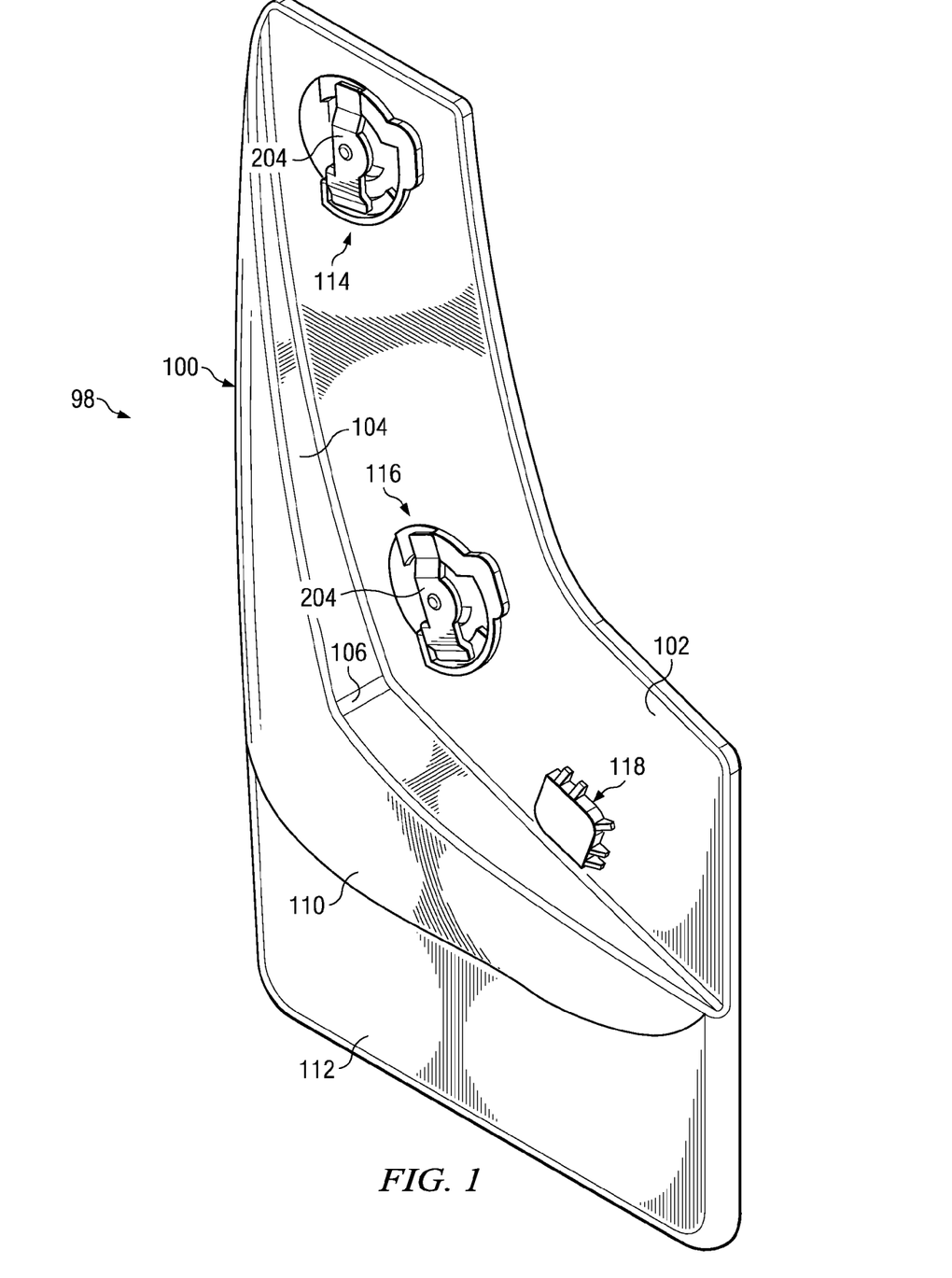
FIG. 1 is an isometric view of a mud flap according to the invention, shown prior to installation on a vehicle and from a rear direction.
Figure 2:
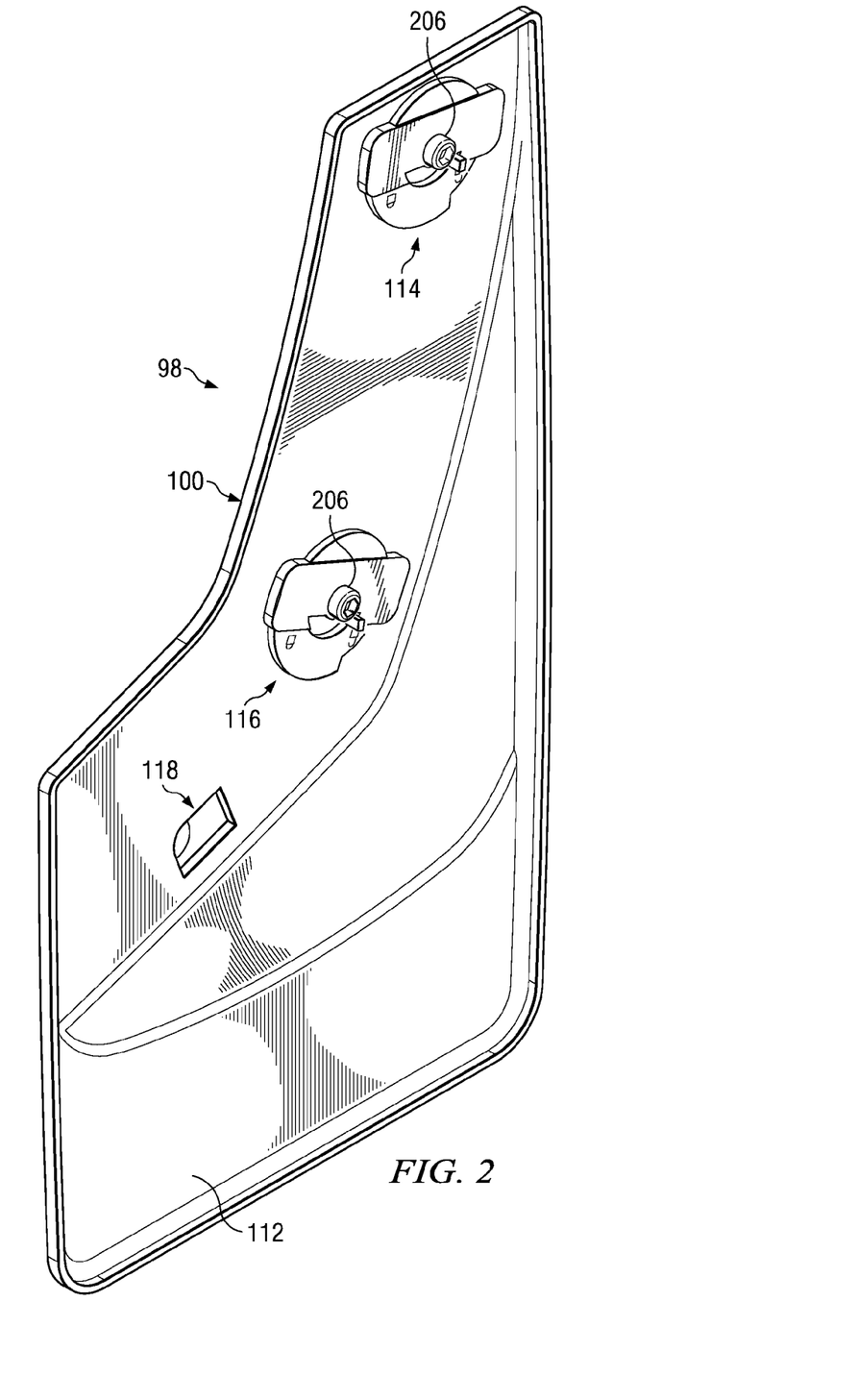
FIG. 2 is an isometric front view of the mud flap shown in FIG. 1.
Figure 3:
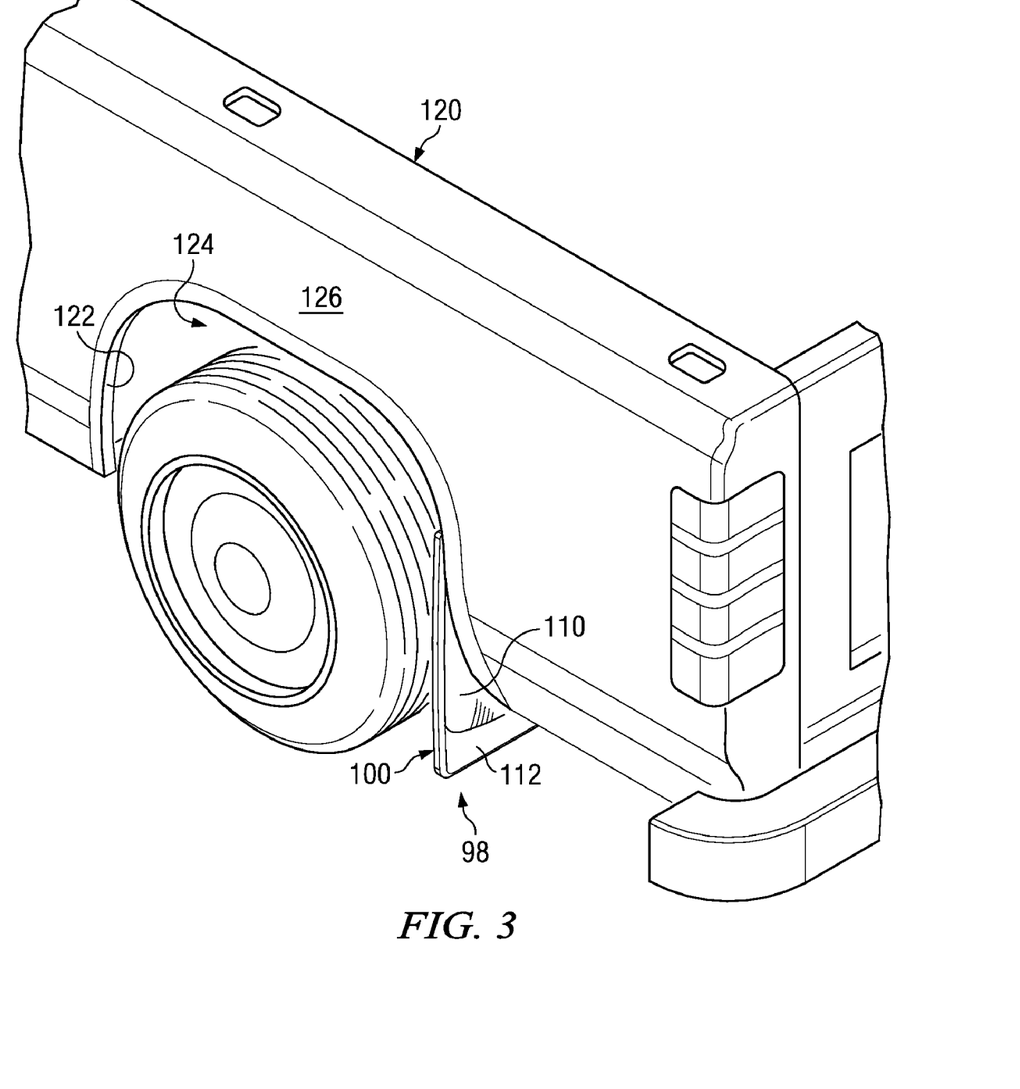
FIG. 3 is an isometric view of the mud flap of FIGS. 1 and 2, shown installed on a vehicle, and from a rear and outboard direction.

FIG. 1 shows a rear view of a mud flap 98 according to the invention and prior to installation, and FIG. 2 is a front view of this uninstalled mud flap. A body 100 of the mud flap 98 is preferably integrally molded from a suitable plastic or rubber polymer. Referring particularly to FIG. 1, the body 100 has a general rear surface 102 which is meant to conform to an interior rear portion of a vehicle wheel well. The pictured mud flap 98 is meant to be fitted to a left rear wheel well of a vehicle 120, as is shown in FIG. 3. As seen in FIG. 1, from the general rear face 102, there rearwardly extends a ledge 104 that, in use, conforms to the exterior body panel of the vehicle. This body panel, and therefore ledge 104, typically will slant in a downward and inboard direction and in many cases will have a corner 106, as shown. From the ledge 104, the mud flap body 100 continues downward, in the illustrated embodiment taking a convex shape 110 as seen from the rear. A terminal panel 112 may extend downwardly from the convex portion 110.

In this illustrated embodiment, the mud flap 98 has three devices to affix it to a vehicle wheel well fender fold: two fasteners 114 and 116, and a tab 118. Fasteners 114 and 116 and tab 118 are preferably well spaced apart from each other to provide three spaced-part affixation points, and also preferably so distributed so as not to be colinear. The tab 118 can also be used with other sorts of fasteners, such as simple screws, bolts or push-fasteners for receipt into OEM-drilled holes in the fender fold, or kinds of clamps other than those illustrated herein. The illustrated embodiment is furnished for a wheel well fender fold which has no predrilled holes at all. In alternative embodiments, only one additional fastener apart from tab 118 may be needed.

Figure 4:
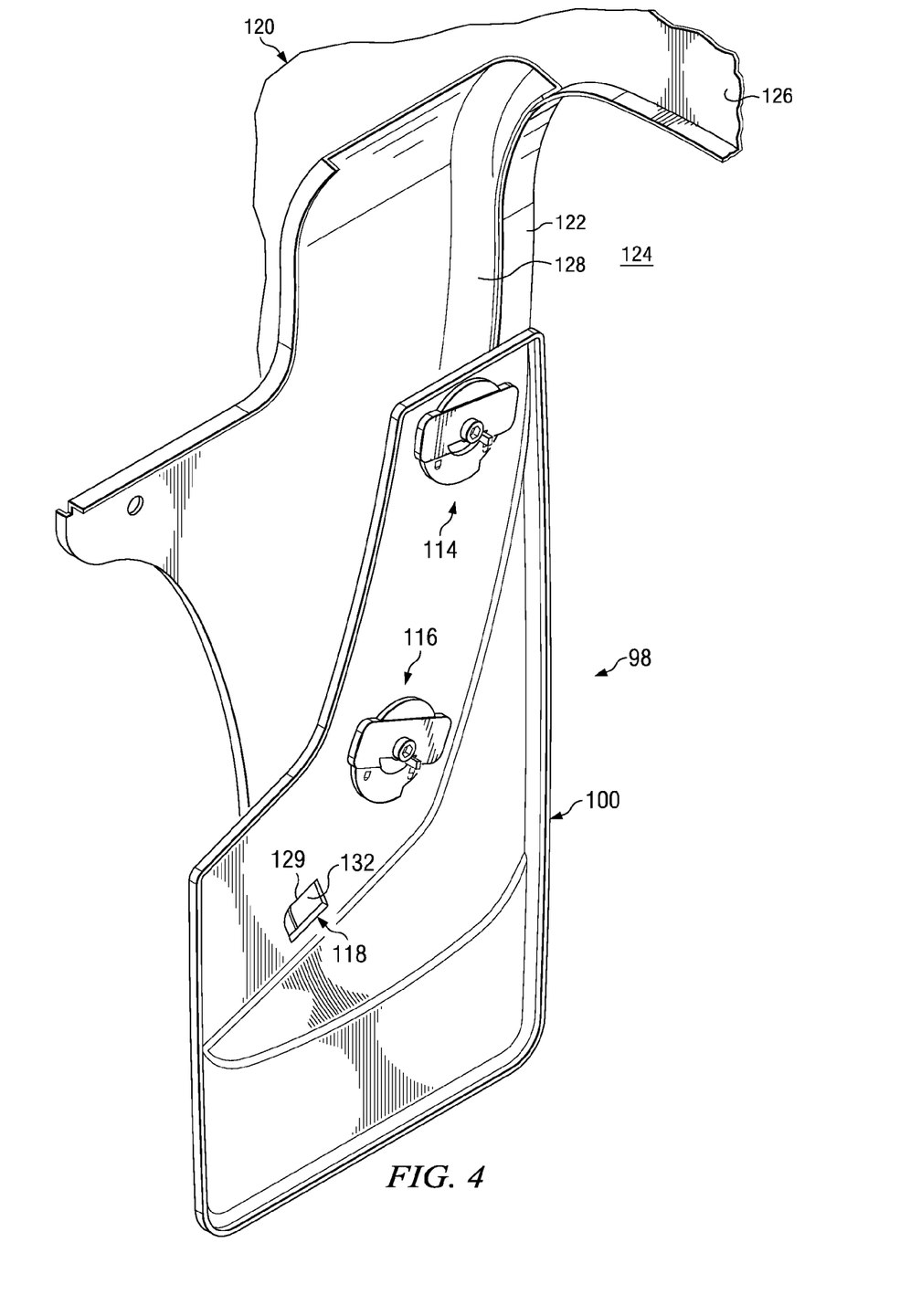
FIG. 4 is an isometric view of the mud flap of FIGS. 1-3, shown from a forward and inboard direction in combination with certain body panels of a vehicle onto which it had been installed.

FIGS. 3 and 4 show the mud flap 98 as affixed to the rear portion of a wheel well of a vehicle 120. In the illustrated embodiment, a fender fold 122 bounds the entirety of the wheel well 124 at its juncture with a body panel 126. In addition, this wheel well is composed in part by a separate inner fender 128 which is welded to the body panel 126. Therefore, at least portions of the fender fold 122 are composed of two thicknesses or laminations of sheet steel or other material making up the vehicle body, and the tab 118 must be designed to fit over the ends of both laminations, as will be described below. In other embodiments, only one thickness or lamination of sheet steel or other body panel material makes up the fender fold and for these embodiments the channel formed by the tab 118 and the rear face 102 may be commensurately narrower.

Near tab 118, preferably a window 129 is left in the mud flap body 100. When the mud flap 98 has been correctly assembled to the vehicle fender fold 122, an end 132 of the fender fold (actually in the illustrated embodiment an end of one of the fender fold laminations, as will be explained below) will be visible to the consumer/installer from the front face of the mud flap body 100. This window 129 is also preferred because it aids in injection-molding the mud flap 98 without requiring a side action in the mold.

Figure 5:
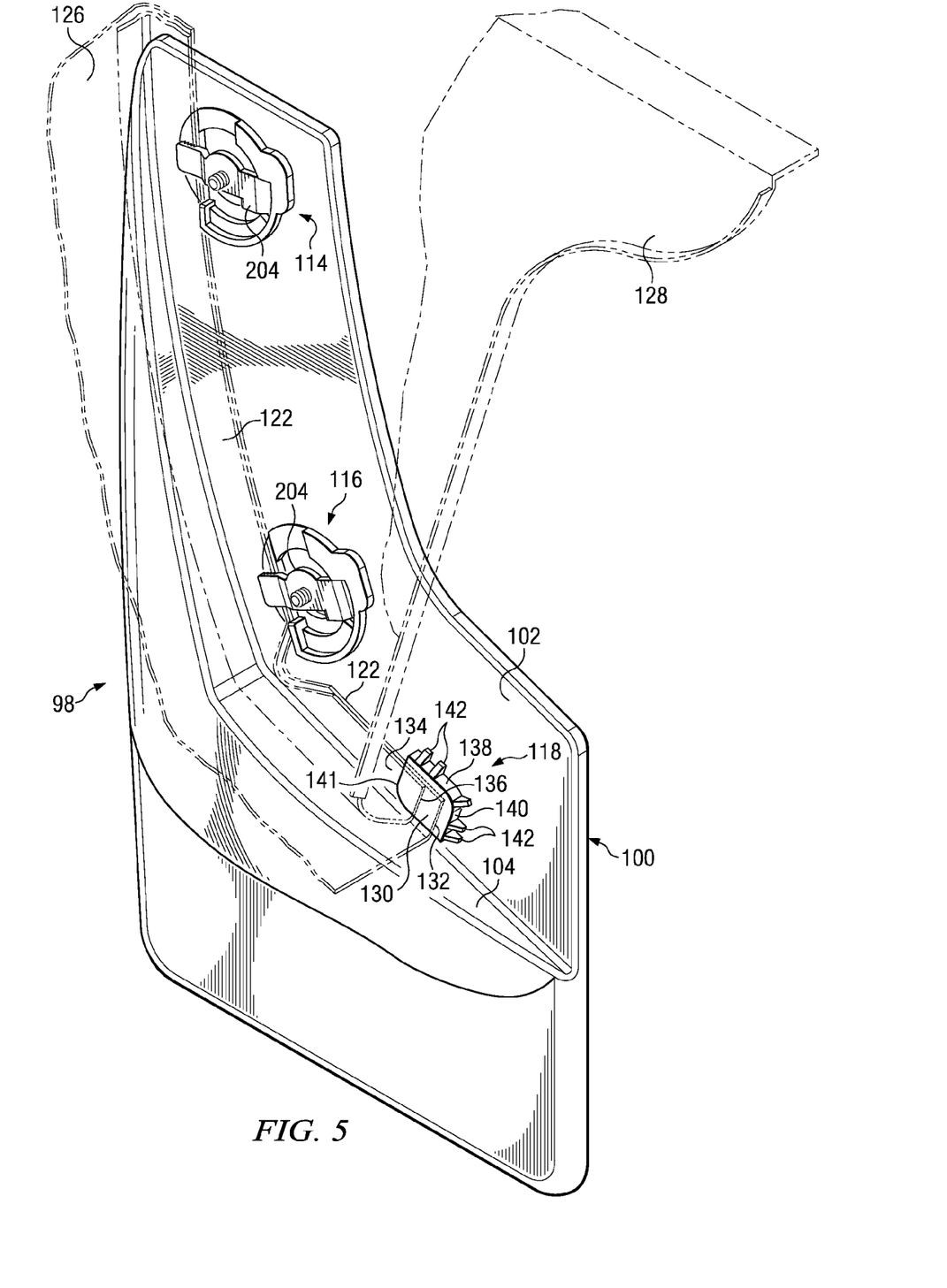
FIG. 5 is a detail showing the relationship of the mud flap tab and fasteners to a vehicle fender fold, the automotive body panels terminating in the fender fold being shown in phantom.

FIG. 5 is a detail of the mud flap 98, with the vehicle body panels 126, 128 onto which the mud flap 98 has been installed being shown in phantom. The tab 118 is disposed upward of the ledge 104. In the illustrated vehicle, the fender fold 122 is made up of the ends of two body panels 126 and 128. At the wheel well, a rear quarter panel 126 terminates in a forward direction in a fender fold lamination 130 that has a fender fold end 132. The body panel 126 also curves in an inboard direction from a vertical plane to almost a horizontal one. In the illustrated vehicle model, an inner fender wall 128 starts as a substantially vertical piece, but near its lower end it is curved forwardly toward the horizontal and then sharply upwardly to form a fender fold lamination 134. The fender fold lamination 134 has an end 136 which, in this embodiment, is not completely aligned with the end 132 of the fender fold lamination 130. The tab 118 should be so constructed so as to fit over and "capture" both ends 132 and 136.

The tab 118 is preferably integrally molded with the rest of the mud flap body 100 and, for ease of molding, is approximately of the same thickness. The tab 118 is preferably joined to the rest of the mud flap body 100 by an upper sidewall 138, an inner surface of which is disposed above an upper margin of the taller of fender fold laminations 130, 134 (here, they are about the same height), and an inboard sidewall 140, an outboard surface of which is displaced by a predetermined amount from the inboardmost one of fender fold component ends 132, 136. It is also preferred that a certain amount of tolerance be built into the fit of the fender fold upper margins to the upper tab sidewall 138, and into the fit of the fender fold lamination ends 132, 136 to the inboard sidewall 140, to take manufacturing variations into account and to ease assembly by the consumer. To this same end, a free margin 141 of the tab 118 is preferably curved so as to more easily permit the insertion of the fender fold ends 132, 136 into the pocket created by tab 118, rear face 102 and sidewalls 138 and 140.

Preferably, an inner surface of sidewall 138 and ledge 104 are substantially parallel to each other and at a distance apart which is preselected to be slightly larger than the height of the fender fold 122. This "cages" the fender fold 122 between these two parallel surfaces, preventing upward or downward movement. A combination of upper sidewall 138, end sidewall 140 and ledge 104 still permit the mud flap 98 to be slid into place in an upper and outboard direction along the fender fold 122 (upward and to the left in FIG. 5), until the fender fold lamination ends 132, 136 are captured by the interaction of tab 118, rear face 102, sidewall 138, ledge 104 and sidewall 140.

Also seen in FIG. 5 is a plurality of reinforcing gussets 142 that preferably are integrally molded with the rest of the mud flap body 100. Each gusset 142 is preferably formed at an angle, and even more preferably a right angle, to the tab 118, to the sidewall 138 or 140 to which the gusset is attached, and to the general rear face 102. Gussets 142 preferably are triangular in shape and extend from the rearwardmost surface of tab 118 to the general rear mud flap body face 102. The gussets 142 are formed to extend from the upper and inboard sides of tab 118 so as not to interfere with the insertion of the fender fold 122.

Figure 6:
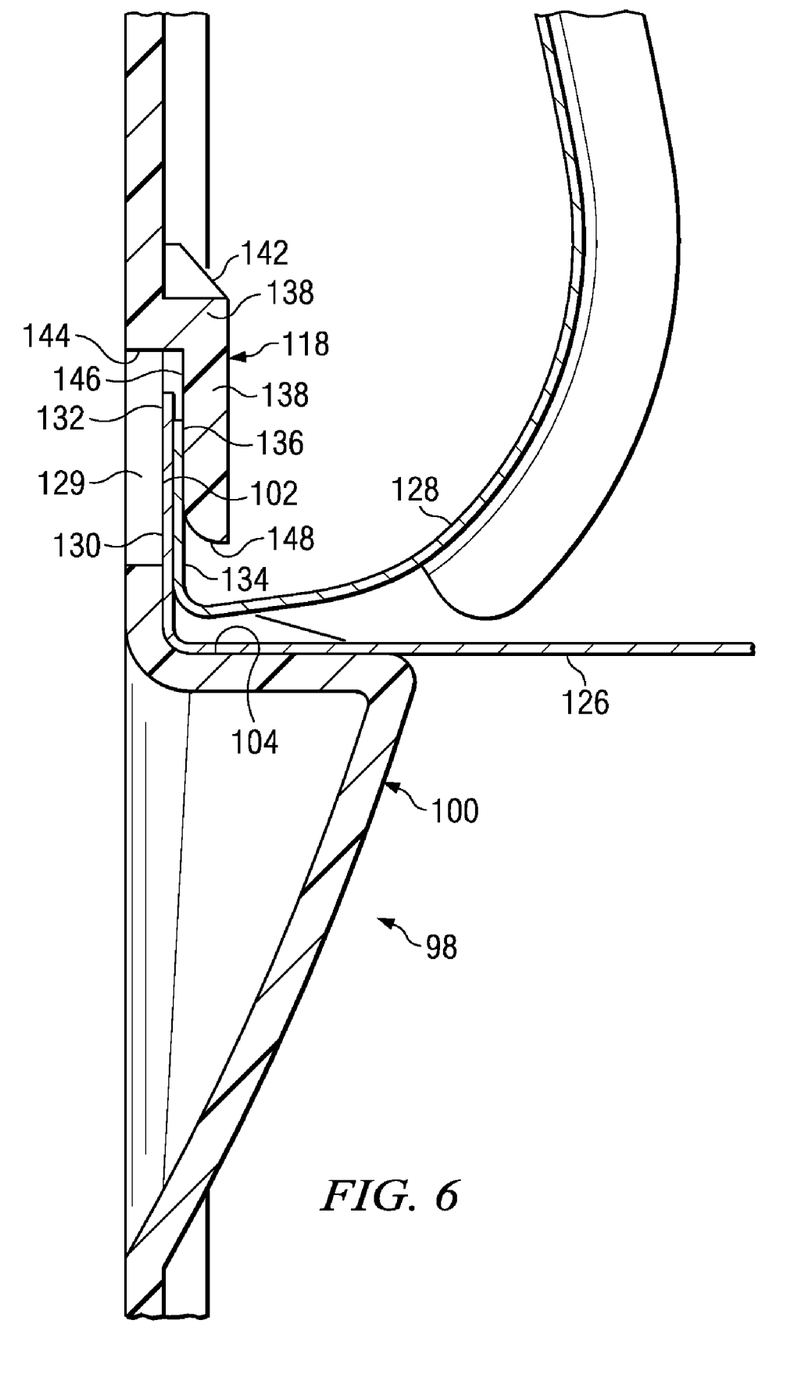
FIG. 6 is a cross-sectional detail taken through a tab and adjacent mud flap body and fender fold.
Figure 7:
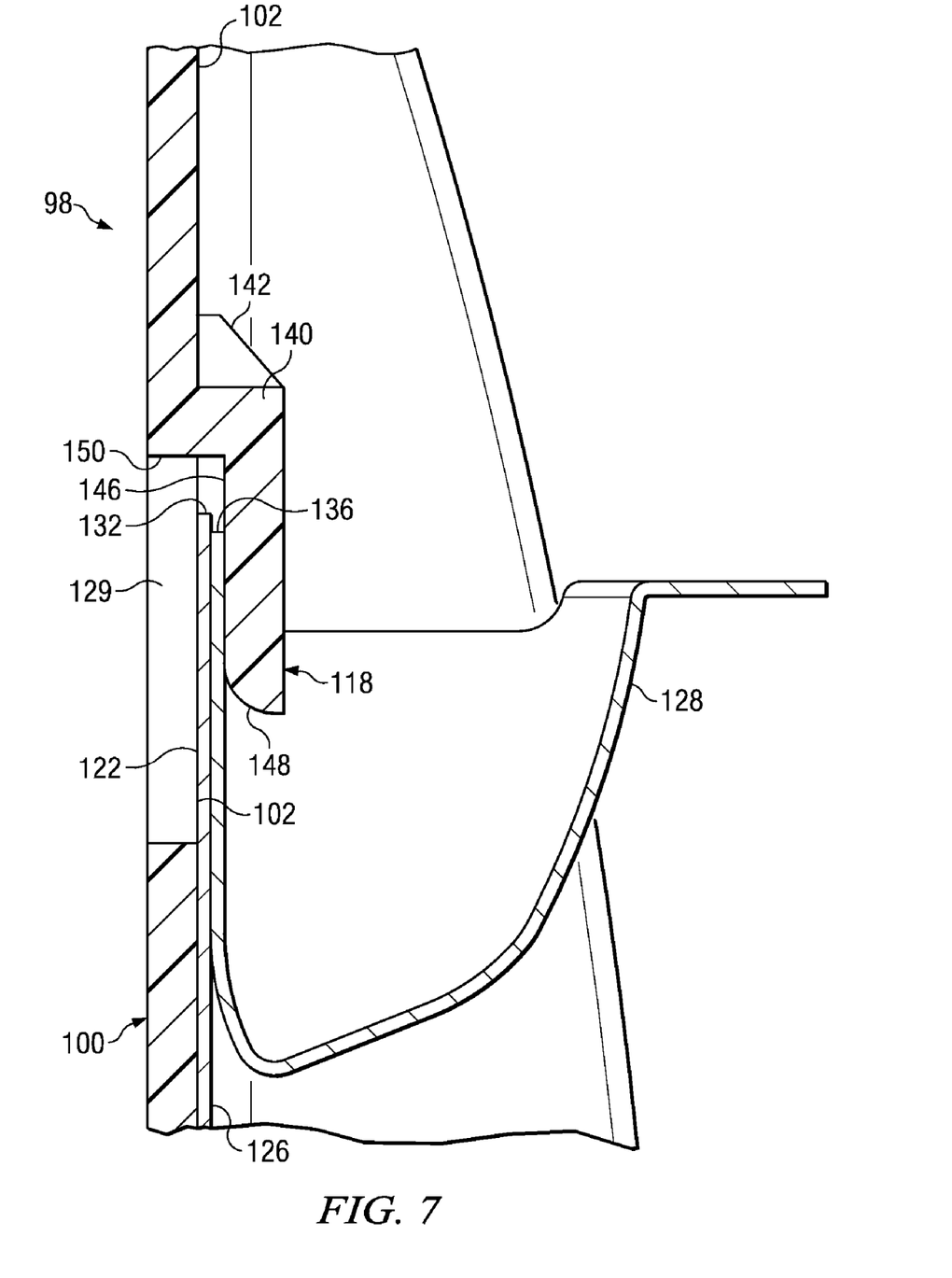
FIG. 7 is a cross-sectional detail taken at about ninety degrees from the cross-section shown in FIG. 6.

FIGS. 6 and 7 are sectional details taken through the mud flap 98 in the area surrounding tab 118. FIG. 6 is a cross section taken in a plane which is substantially vertical and parallel to the direction of vehicle travel while FIG. 7 shows a horizontal cross section substantially at right angles to the section shown in FIG. 6. Referring to FIG. 6, an inner or lower surface 144 of the upper sidewall 138 is positioned to be above the upper limit of fender fold lamination 130. Surface 144 is also preferably substantially parallel to ledge 104. The distance between surfaces 144, 104 is chosen to be somewhat greater than a height of the taller of the fender fold laminations 130, 134 to ease installation and accommodate variation in vehicle panel manufacture.

A front surface 146 of the tab 118 is positioned rearwardly (in FIG. 6, to the right) from the general rear face 102 by enough of a distance that the fender fold 122 (in the illustrated embodiment, made up by two laminations 130, 134) can be slid therebetween. To further aid installation, it is preferred that an end 148 of the front tab surface 146 be rearwardly curved, as shown.

As best seen in FIG. 7, an inboard surface 150 of end sidewall 140 is positioned to be well outboard (upward in FIG. 7) of the predicted position of fender fold lamination ends 132, 136. This eases installation and accommodates some variation in the formation and joining together of the vehicle panels. It can be seen that free tab surface end 148 is rearwardly curved in the plane of this section also, once again to promote easy registration of the fender fold 122 into the slot or channel created by the tab 118 and the general mud flap body rear face 102.

While the tab 118 can be used in combination with any other mud flap fastener including fasteners meant to be received in holes in the fender fold 122, the use of one or more clamping fasteners is preferred at least in those instances where the vehicle manufacturer has not predrilled such holes. A particularly preferred clamping fastener 116 will be described in more detail below; it is preferred that fastener 114 be similar. The fastener 116 is so constructed that the consumer may conveniently, yet securely, install the mud flap 98 without getting underneath the vehicle, and without, in at least some circumstances, obtaining physical access to the rear side of the fender fold 122.

Figure 8:
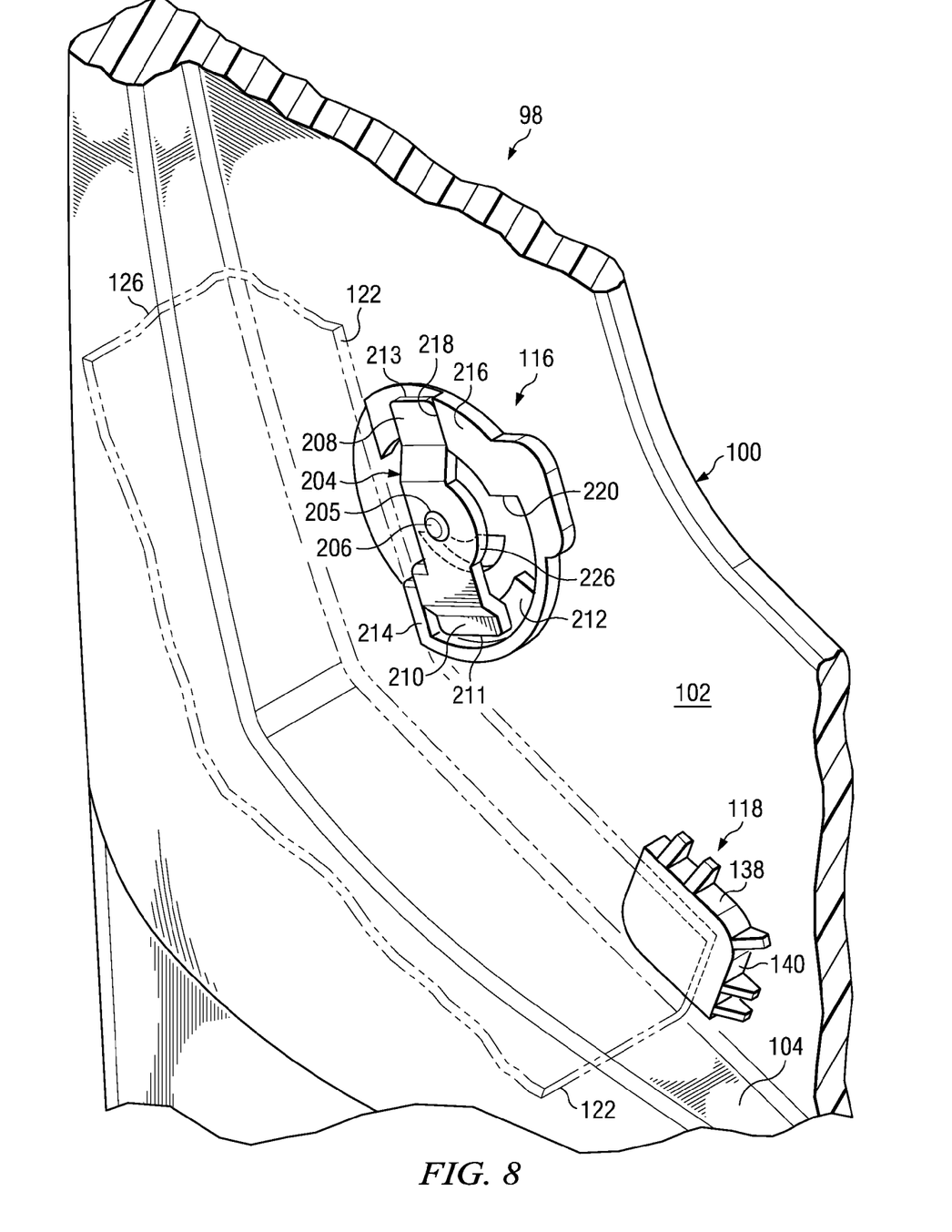
FIG. 8 is a detail of a mud flap according to the invention, taken from a rearward and inboard direction, showing a rotating member of a preferred mud flap fastener in a first, disengaged position.
Figure 9:
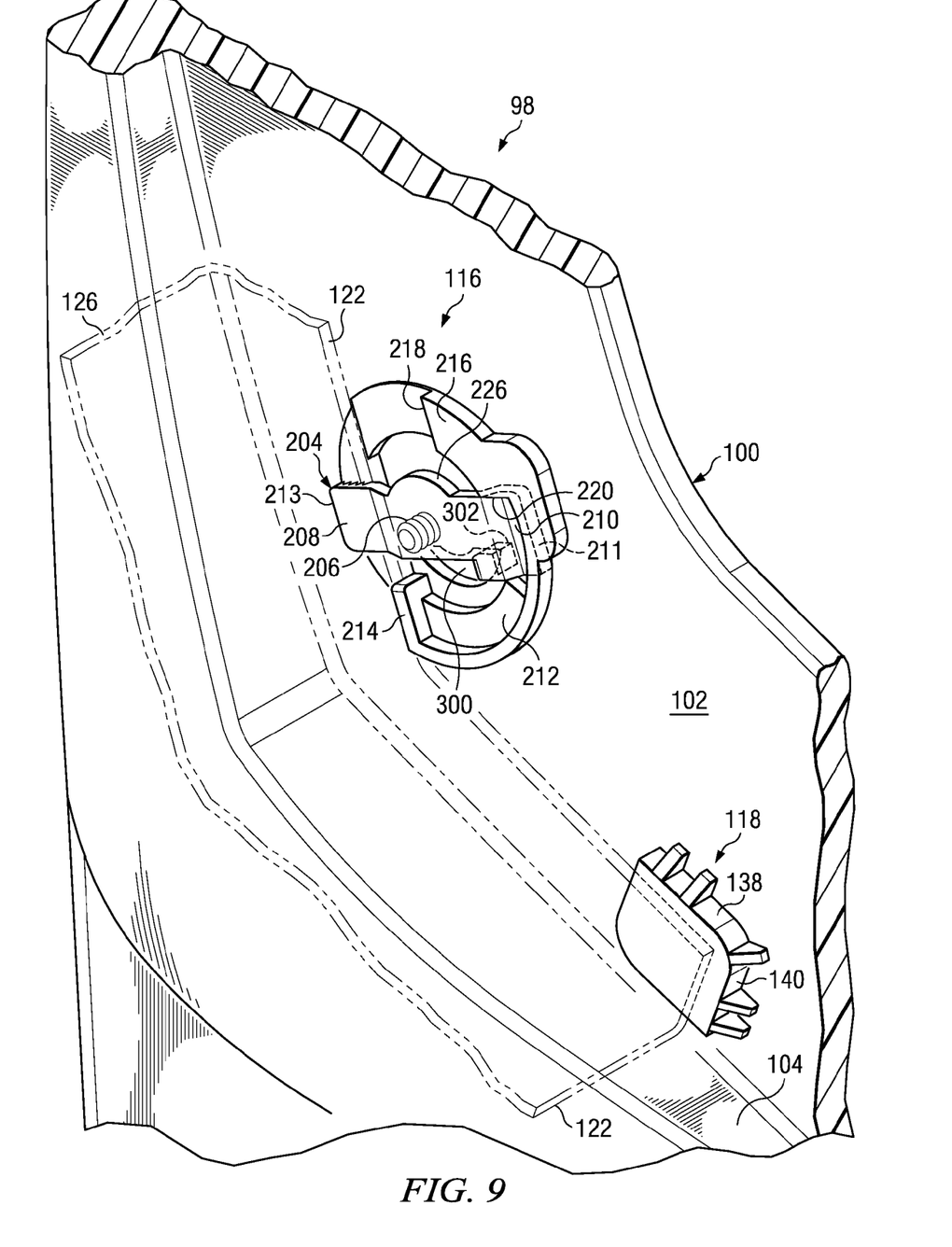
FIG. 9 is a view similar to that shown in FIG. 8, but after the rotating member has been rotated to a second, engaged position.

FIGS. 8 and 9 show a mud flap 98 in the process of being installed in a wheel well of a vehicle. The view of these FIGURES is from a rearward and inboard direction. The body panel 126, and the panel-terminating fender fold 122, are shown in phantom in FIGS. 8 and 9. In the embodiment shown in FIGS. 8 and 9, the fender fold 122 is formed of only a single lamination. In the illustrated embodiment, at the location where fastener 116 engages it, the fender fold 122 will stand substantially vertically or at a steep angle from the horizontal, and in a plane transverse to the direction of travel of the vehicle. But the fastener 116 of the present invention may be used to clamp the mud flap 98 to other locations along the fender fold 122, such as a location higher up in the wheel well, and as shown more than one fastener 114, 116 may be used to secure a single mud flap 98 to the vehicle.

FIG. 8 shows a rotating member 204 of the fastener 116 having a threaded center hole 205 threaded onto a central bolt or screw 206. The bolt 206 is rotatable by a consumer or installer from the opposed, front surface of the mud flap 98 (see FIG. 4) and extends through a nonthreaded bolt hole in the mud flap 98. The rotating member 204 has a clamping arm 208 which radially extends from the axis of bolt 206, and, angularly separated from it, a stop arm 210 which also radially extends from the axis of bolt 206. Preferably the stop arm 210 and the clamping arm 208 are angularly separated by about 180 degrees. The stop arm 210 has a frontwardly offset stop end 211. The clamping arm 208 similarly has a frontwardly offset clamping end 213.

The general rear face 102 of the mud flap 98 has a preferably arcuate shelf or rest 212 which protrudes rearwardly from the general plane of the rear surface 102 by a height which is typically chosen to be greater than the thickness of the fender fold 122. For ease in manufacture, the rest 212 can be molded as indentation of an otherwise generally flat and generally uniformly thick mud flap 98. The rest 212 is positioned to be underneath (forward of) the stop end 211 through a predetermined arc of travel of the stop arm 210. This arc is preferably chosen to extend from a first unengaged position of the stop arm 210 (shown in FIG. 2) to a position at which the stop end 211 will be disposed when the clamping end 213 begins to slide behind the fender fold 122. The purpose of the rest 212 is to prevent frontward movement of the rotating clamping member 204 relative to the bolt 206 and the fender fold 110 until the clamping arm has begun to slide behind the fender fold 122. At a first end of the shelf 212 is a rearwardly projecting lug 214 which acts as a stop to prohibit (in this FIGURE) clockwise rotation of the stop arm 210 and also acts as an abutment surface against which the fender fold 122 can be fitted.

Another rearward projection from the general planar rear surface 102 of the mud flap 112 is a stop 216. Like shelf or rest 212, stop 216 can be molded as an indentation into a region of the mud flap 112 that otherwise has a substantially uniform thickness. The stop 216 may be formed as an arc around the axis of bolt 206, but in any event has two angularly spaced, rearwardly projecting surfaces that are parallel to the axis of bolt 206: a clamping end stop surface 218 against which the clamping end 213 will abut while the rotating clamping member 204 is in the first position, as shown in FIG. 8, and a stop end stop surface 220 against which the stop end 211 will abut while the rotating clamping member is in a second position, as shown in FIG. 9. The surfaces 218 and 220 are deep enough that they will intersect the arcs of travel of the respective clamping and stop ends 213, 211.

In the embodiment shown in FIGS. 8 and 9, the right end of the rest 212 and the stop surface 220 are spaced apart by a surface which is substantially coplanar with the general rear mud flap surface 102. Such an open region could be provided in order to account for variations in the thickness of fender fold 122 and in any attached primer, filler and paint, which can vary from one specific vehicle to the next, even within the same vehicle model. Permitting the stop end 211 to slip frontwardly of the rest 212 allows the opposed clamping end 213 to tilt rearwardly, better assuring that the clamping end 213 will slide behind the fender fold 122 as intended.

In an alternative embodiment, the right end of the rest 212 and the stop surface 220 are spaced apart by a shallow arcuate shelf (not shown) which is typically chosen to be about as thick as the thickness of the fender fold 122. This shelf would receive stop arm end 211 when the rotating clamping member 204 is completely behind the fender fold 122, as is seen in FIG. 9.

Also as seen in FIG. 9, an arcuate slot 300 is formed through the mud flap 98 to be concentric of the bolt 206. A finger 302 of the rotating clamping member 204 is bent or otherwise formed to extend frontwardly (in this FIGURE, to the right) in a direction substantially parallel to the bolt or screw axis. The arcuate slot 300 is sized to receive this finger 302. The finger 302 will be visible from the front side of the mud flap 98 and indicates the position of the rotating member 204 relative to the fender fold 122.

As provided to the consumer, the rotating member 204 should take the position shown in FIG. 8 and should not rotate freely and independently of the bolt 206. There needs to be some resistance to the threaded rotation of the member 204 on bolt 206. This can be provided, for example, by coating the end of the threads on bolt 206, or distorting the thread pattern on the end of the bolt to make threaded rotation of the member 204 relative to bolt 206 more difficult, or by distorting the female threads in the central hole 205 formed in the rotating member 204. This resistance to threaded or helical movement permits the clamping end 213 of the rotating member 204 to slide behind the fender fold 122, in a position that is most rearward on the bolt 206. Otherwise, there is an enhanced danger that the rotating clamping member 204 will start being drawn forwardly on threaded bolt 206 even before its clamping end has slid behind the fender fold 122.

The presence of a bolt-receiving hole 205 in the middle of the rotating clamping member 204 creates a structural weakness at this point; if uncompensated for, any tendency of the rotating member 204 to bow or flex when clamped to the fender fold 110 will occur preferentially in a plane including the bolt hole axis. To compensate for this weakness because of the loss of material, it is preferred to form the rotating clamping member 204 to have a central section 226 which is wider than the stop or clamping arms 208, 210 which extend to either side of it. The central enlarged portion 226 can conveniently take an arcuate shape as shown. Its radius or lateral extent should be chosen so as not to occlude the arcuate slot 300.

Figure 10A:
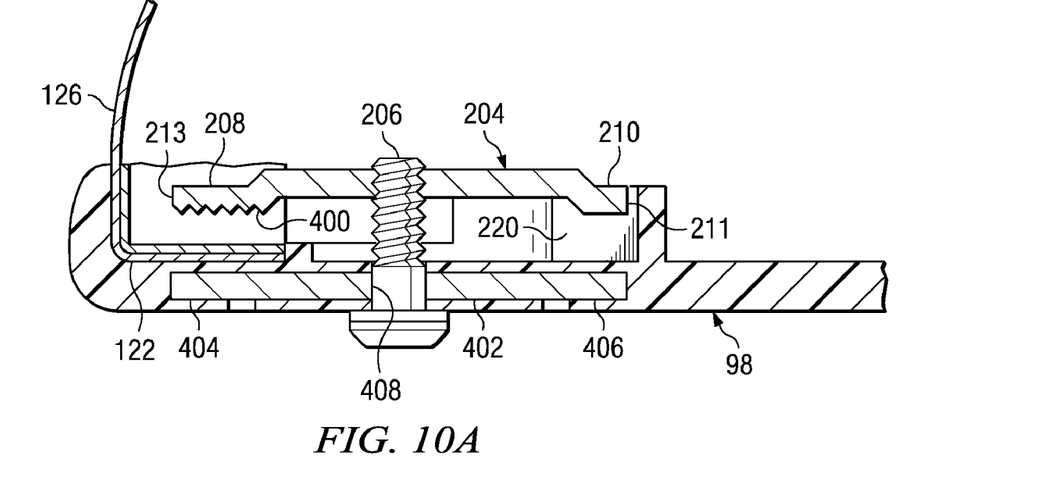
FIG. 10A is a sectional view taken through the mud flap and fender fold in a plane which includes a fastener bolt hole, showing the rotating member in the second position and prior to tightening.
Figure 10B:
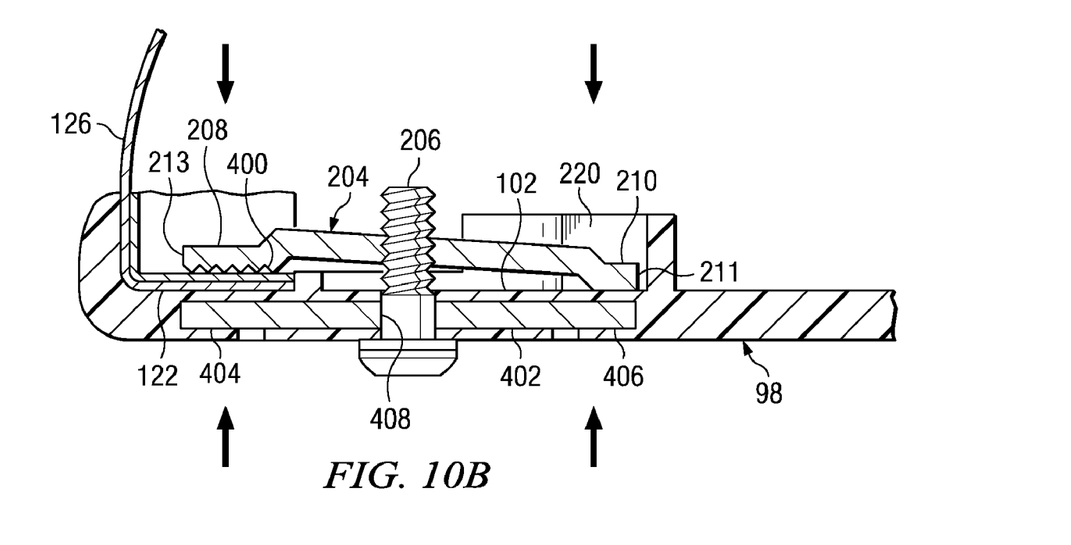
FIG. 10B is a sectional view similar to that of FIG. 10A, after the rotating member has been threadably pulled in on the fastener bolt to a third position, clamping the mud flap to the fender fold.

FIGS. 10A and 10B are sectional views taken from above through the bolt axis, wherein the rotating clamping member 204 is in the angular position seen in FIG. 9. In FIG. 10A, the rotating clamping member 204 is still residing on the free end of threaded bolt 206. Its stop arm 210 has come into contact with stop surface 220, such that further rotation of member 204 and bolt 206 as a unit will be prevented. At this point, further rotation of the bolt 206 will cause the rotating clamping member 204 to advance forwardly (in this view, downwardly) down the threads of bolt 206, until the position shown in FIG. 10B is reached. In this later position, teeth or ridges 400 formed on a forward side of the stop end 213 begin to grip the rearward (here, upward) surface of the fender fold 122, while offset end 211 begins to be supported by surface 102.

It is further preferred to provide a stationary clamping member 402 against which the rotating clamping member 204 may exert clamping force. In the illustrated embodiment, the stationary clamping member 402 is provided as an in-molded reinforcement to the otherwise rubber or other polymeric mud flap 98. In other, nonillustrated embodiments, the stationary clamping member 402 is omitted and the clamping action takes place between the mud flap body and the rotating clamping member 204. In the illustrated embodiment, the stationary clamping member 402 is preferably about as thick as the rotating clamping member 204 (such as 0.125 in.), and is preferably made of a tough and durable material such as stainless steel. The stationary clamping member should be at least coextensive in length with the clamping member 204, such that a first end 404 will be opposite the clamping end 213 of the rotating clamping member 204 when the latter has been rotated to the second position, and a second end 406 of the stationary member 402 will be opposite the stop end 211 in this position. Conveniently, the stationary member 402 and the rotating clamping member 204 can be fashioned from the same blank stamped out of sheet steel; in the instance of the rotating clamping member 204, the blank's central hole would be tapped, the ends 211, 213 offset, and the finger 302 cut and bent; in the instance of stationary member 402, a larger central hole 408 would be drilled to nonthreadedly receive the bolt 206 and a strip including 302 would be cut and removed. In other embodiments the stationary member can be rectangular.

As shown in FIG. 10B, after fully tightening the bolt 206, the stop end 211 abuts the rearward (here, upward) surface 102 of the mud flap 98. When this happens, the contact between the stop end 211 and the shelf 228 will act as a fulcrum, concentrating more clamping force between clamping end 213 and the end 404 of the stationary clamping member 402. To maximize this leverage, it is preferred that the clamping arm 208 and the stop arm 210 be angularly spaced apart by about 180 degrees.

FIGS. 10A and 10B also demonstrate the advantage of offsetting the ends 213 and 211 in a forward direction. As so offset, the end 213 will contact the fender fold 122 first, concentrating clamping force within a limited footprint. The end 211 will contact surface 102 prior to the un-offset rest of the clamping member 204 bottoming out on the mud flap 98, thereby locating the fulcrum at a maximum distance away from the fender fold 122 and maximizing clamping leverage exerted by bolt 206.

In summary, a mud flap equipped with a fender fold end-capturing tab and preferably a clamping fastener has been shown and illustrated which obviates the need for drilling new holes in fender folds or other vehicle purchase points.

While certain embodiments of the present invention have been described above and illustrated in the appended drawings, the present invention is not limited thereto but only by the scope and spirit of the appended claims.

I claim:

1. A mud flap for attachment to a fender fold of a vehicle wheel well, comprising:
    a mud flap body having a front face facing in a direction of vehicle travel and a general rear face opposed to the front face, the rear face adapted to be positioned forwardly adjacent a fender fold of a vehicle;
    a tab having a forward surface substantially parallel to and rearwardly displaced from the general rear face of the mud flap body to define a fender fold channel therebetween, the tab connected to the mud flap body by at least one sidewall which is displaced from the fender fold channel, such that in use, the tab, as interacting with the general rear face of the mud flap body, captures the fender fold between the tab and the general rear face of the mud flap body, thereby aiding in attaching the mud flap to the vehicle;
    wherein the tab and said at least one sidewall are integrally molded from a polymer with the body.

2. The mud flap of claim 1, wherein said at least one sidewall is an end sidewall, the fender fold having an inboard end, the end sidewall positioned inboard of the inboard end of the fender fold.

3. The mud flap of claim 1, wherein said at least one sidewall is a top sidewall, the fender fold having an upper margin, the top sidewall positioned upward of the upper margin of the fender fold.

4. The mud flap of claim 1, in which the fender fold comprises a plurality of fender fold laminations respectively terminating a plurality of vehicle body panels, an end of each fender fold lamination being captured between the tab and the general rear face of the mud flap body.

5. The mud flap of claim 1, wherein the tab has at least one free edge opposed to said at least one sidewall, the free edge being curved or chamfered toward the general rear face of the body to more easily permit the fender fold to be inserted into the channel.

6. The mud flap of claim 1, wherein a window is formed in the mud flap body adjacent the tab, such that an installer positioned frontward of the mud flap body can see the captured end of the fender fold through the window when the mud flap is correctly installed on the vehicle fender fold.

7. The mud flap of claim 1, and further comprising:
    at least one fastener spaced from the tab and adapted to affix the mud flap to the vehicle fender fold at a second affixation point, the fastener including a screw-threaded attachment bolt received into a through-hole formed in the mud flap body from the front face to the general rear face thereof, the bolt disposed on an axis;

a rotating clamping member of the fastener having a center hole which is threadably carried on the attachment bolt, the rotating clamping member disposed rearwardly from the general rear face of the mud flap body, a clamping arm of the rotating clamping member extending radially outwardly from the bolt axis and terminating in a clamping end, a stop arm of the rotating clamping member extending radially outwardly from said axis to be angularly displaced from the clamping arm, the stop arm terminating in a stop end, the rotating clamping member rotatable around the axis from a disengaged position to a second position;

a stop formed to extend rearwardly from the general rear face of the mud flap body, a height of the stop measured in an axial direction preselected to intersect an arc of travel of the stop end of the rotating clamping arm such that the stop end of the clamping arm will abut the stop when the rotating clamping member reaches the second position; and an edge of the mud flap body placed forwardly of the fender fold, the rotating clamping member and the attachment bolt rotatable as a unit from the disengaged position to the second position such that the clamping end of the rotating member becomes positioned to the rear of the fender fold, and such that the stop end of the rotating member abuts said stop, further rotation of the attachment bolt causing the rotating clamping member to be drawn axially forwardly toward the general rear face of the mud flap body and causing the clamping of the fender fold between the clamping end of the rotating clamping member and the general rear face of the mud flap body.

8. The mud flap of claim 7, wherein the mud flap has a second fastener, spaced from the tab and said at least one fastener, and an including a second attachment bolt and a second rotating clamping member, the second fastener adapted to affix the mud flap to the vehicle fender fold at a third affixation point.

9. A mud flap for attachment to a fender fold of a vehicle wheel well, comprising:

a mud flap body having a front face facing in a direction of vehicle travel and a general rear face opposed to the front face, the rear face adapted to be positioned forwardly adjacent a fender fold of a vehicle;

a tab having a forward surface substantially parallel to and rearwardly displaced from the general rear face of the mud flap body to define a fender fold channel therebetween, the tab connected to the mud flap body by at least one sidewall which is displaced from the fender fold channel, such that in use, the tab, as interacting with the general rear face of the mud flap body, captures the fender fold between the tab and the general rear face of the mud flap body, thereby aiding in attaching the mud flap to the vehicle, wherein said at least one sidewall is a top sidewall, the fender fold having an upper margin, the top sidewall positioned upward of the upper margin of the fender fold and the mud flap body includes a ledge which projects rearwardly from said general rear face of the mud flap body, the ledge adapted to conform to an external surface of the vehicle, the ledge disposed, in a downward and outboard direction from the tab and disposed, in use, in a downward and outboard direction from the fender fold, a lower surface of said top sidewall of the tab being substantially parallel to said ledge so as to vertically cage the fender fold therebetween.

10. A mud flap for attachment to a fender fold of a vehicle wheel well, comprising:

a mud flap body having a front face facing in a direction of vehicle travel and a general rear face opposed to the front face, the rear face adapted to be positioned forwardly adjacent a fender fold of a vehicle; and a tab having a forward surface substantially parallel to and rearwardly displaced from the general rear face of the mud flap body to define a fender fold channel therebetween, the tab connected to the mud flap body by a top sidewall and an end sidewall which are displaced from the fender fold channel, such that in use, the tab, as interacting with the general rear face of the mud flap body, captures the fender fold between the tab and the general rear face of the mud flap body, thereby aiding in attaching the mud flap to the vehicle, the fender fold having an inboard end and an upper margin, the end sidewall positioned inboard of the inboard end of the fender fold, the top sidewall positioned above the upper margin of the fender fold.

11. A mud flap for attachment to a fender fold of a vehicle wheel well, comprising:

mud flap body having a front face facing in a direction of vehicle travel and a general rear face opposed to the front face, the rear face adapted to be positioned forwardly adjacent a fender fold of a vehicle;

a tab having a forward surface substantially parallel to and rearwardly displaced from the general rear face of the mud flap body to define a fender fold channel therebetween, the tab connected to the mud flap body by at least one sidewall which is displaced from the fender fold channel, such that in use, the tab, as interacting with the general rear face of the mud flap body, captures the fender fold between the tab and the general rear face of the mud flap body, thereby aiding in attaching the mud flap to the vehicle, and further including at least one reinforcing gusset formed at an angle to, and extending between, said at least one sidewall and the general rear face of the body.

* * * * *